US009178866B2

(12) United States Patent
Brezinski et al.

(10) Patent No.: US 9,178,866 B2
(45) Date of Patent: *Nov. 3, 2015

(54) TECHNIQUES FOR USER AUTHENTICATION

(71) Applicant: Amazon Technologies, Inc., Reno, NV (US)

(72) Inventors: Dominique I. Brezinski, Seattle, WA (US); Benjamin S. Kirzhner, Seattle, WA (US); Emilia S. Buneci, Seattle, WA (US); Martin M. O'Reilly, Dublin (IE); Cyrus J. Durgin, Seattle, WA (US); Lane R. LaRue, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/557,222

(22) Filed: Dec. 1, 2014

(65) Prior Publication Data

US 2015/0089616 A1   Mar. 26, 2015

Related U.S. Application Data

(63) Continuation of application No. 14/080,599, filed on Nov. 14, 2013, now Pat. No. 8,925,062, which is a continuation of application No. 13/341,468, filed on Dec. 30, 2011, now Pat. No. 8,613,066.

(51) Int. Cl.
| | |
|---|---|
| *H04L 29/06* | (2006.01) |
| *G06F 21/31* | (2013.01) |
| *G06F 21/32* | (2013.01) |
| *G06F 21/42* | (2013.01) |
| *G07C 9/00* | (2006.01) |

(52) U.S. Cl.
CPC ............. *H04L 63/08* (2013.01); *G06F 21/31* (2013.01); *G06F 21/32* (2013.01); *G06F 21/42* (2013.01); *G07C 9/00166* (2013.01); *H04L 63/10* (2013.01); *G06F 2221/2103* (2013.01)

(58) Field of Classification Search
CPC ..... G07C 9/00166; G06F 21/31; G06F 21/32; G06F 21/42; G06F 2221/2103; H04L 63/08; H04L 63/10
USPC .................. 726/2, 5, 7; 713/168, 183, 184
See application file for complete search history.

(56) References Cited

U.S. PATENT DOCUMENTS

| | | |
|---|---|---|
| 7,606,915 B1 | 10/2009 | Calinov et al. |
| 8,006,291 B2 | 8/2011 | Headley et al. |
| 8,006,300 B2 * | 8/2011 | Mizrah ............................ 726/20 |

(Continued)

*Primary Examiner* — Kambiz Zand
*Assistant Examiner* — Tongoc Tran
(74) *Attorney, Agent, or Firm* — Seed IP Law Group PLLC

(57) ABSTRACT

Techniques for user authentication are disclosed. In some situations, the techniques include receiving, from a client device, an authentication request to access a network resource, the request including a user identifier, obtaining a security credential associated with the user identifier contained in the received request, generating an authorization code based on the obtained security credential, providing to the client device instructions to obtain first information corresponding to the generated authorization code, receiving, from the client device, the first information provided in response to the provided instructions, and, when the first information received from the client device corresponds to at least a portion of the generated authorization code, authorizing the client device to access the network resource.

22 Claims, 6 Drawing Sheets

(56) References Cited

U.S. PATENT DOCUMENTS

| | | |
|---|---|---|
| 8,145,914 B2 | 3/2012 | Steeves |
| 8,281,371 B1 * | 10/2012 | Chickering et al. .............. 726/4 |
| 8,331,935 B2 | 12/2012 | Tamura et al. |
| 8,365,258 B2 * | 1/2013 | Dispensa .......................... 726/5 |
| 8,458,230 B2 * | 6/2013 | Korablev et al. .............. 707/809 |
| 8,812,859 B2 * | 8/2014 | Yeap et al. ..................... 713/182 |
| 8,826,030 B2 * | 9/2014 | White et al. ................... 713/186 |

\* cited by examiner

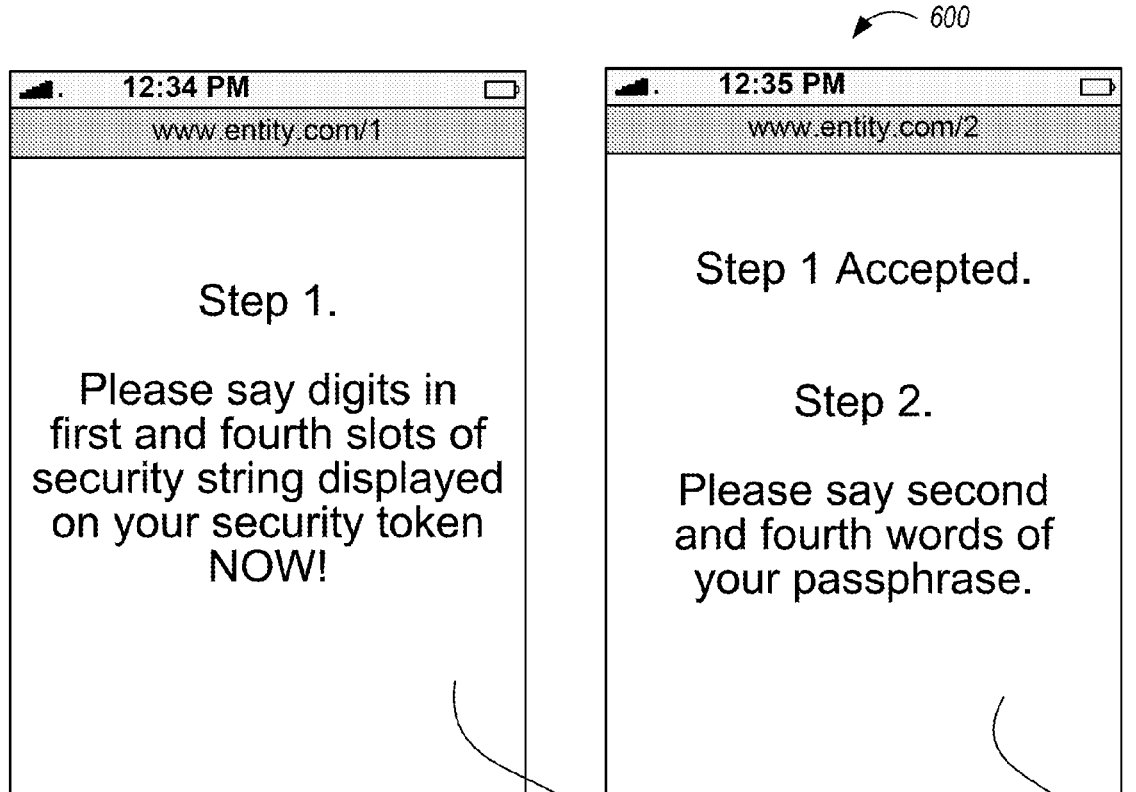
*Fig. 6A*
*Fig. 6B*
*Fig. 6C*

TECHNIQUES FOR USER AUTHENTICATION

BACKGROUND

Users may be required to register with a network resource in order to access the resource, e.g., a Web site. Any person may become a registered user by providing user information that includes some credentials, usually in the form of a username and/or password that are stored with the network resource and serve to authenticate a registered user when the registered user desires to access the resource. Normally, a content item of a network resource (e.g., a login page of a Web site) is displayed on a user computing device that requires the user to type in and enter, via a device keyboard, his or her credentials (e.g., username and/or password). However, this procedure may involve substantial security risk if a user is entering his or her credentials in an unsafe environment, for example if the user is surrounded by strangers that may obtain the user's credentials by overseeing the user's actions. Furthermore, in some instances, using a computing device keyboard for entering the user credentials may prove unsafe or difficult, for example, if the user is driving a car or if the user's manual dexterity or vision is low.

BRIEF DESCRIPTION OF THE DRAWINGS

FIGS. 6A, 6B, and 6C illustrate example screenshots of a user interface for an authentication service in accordance with an embodiment.

DETAILED DESCRIPTION

Figure 1:
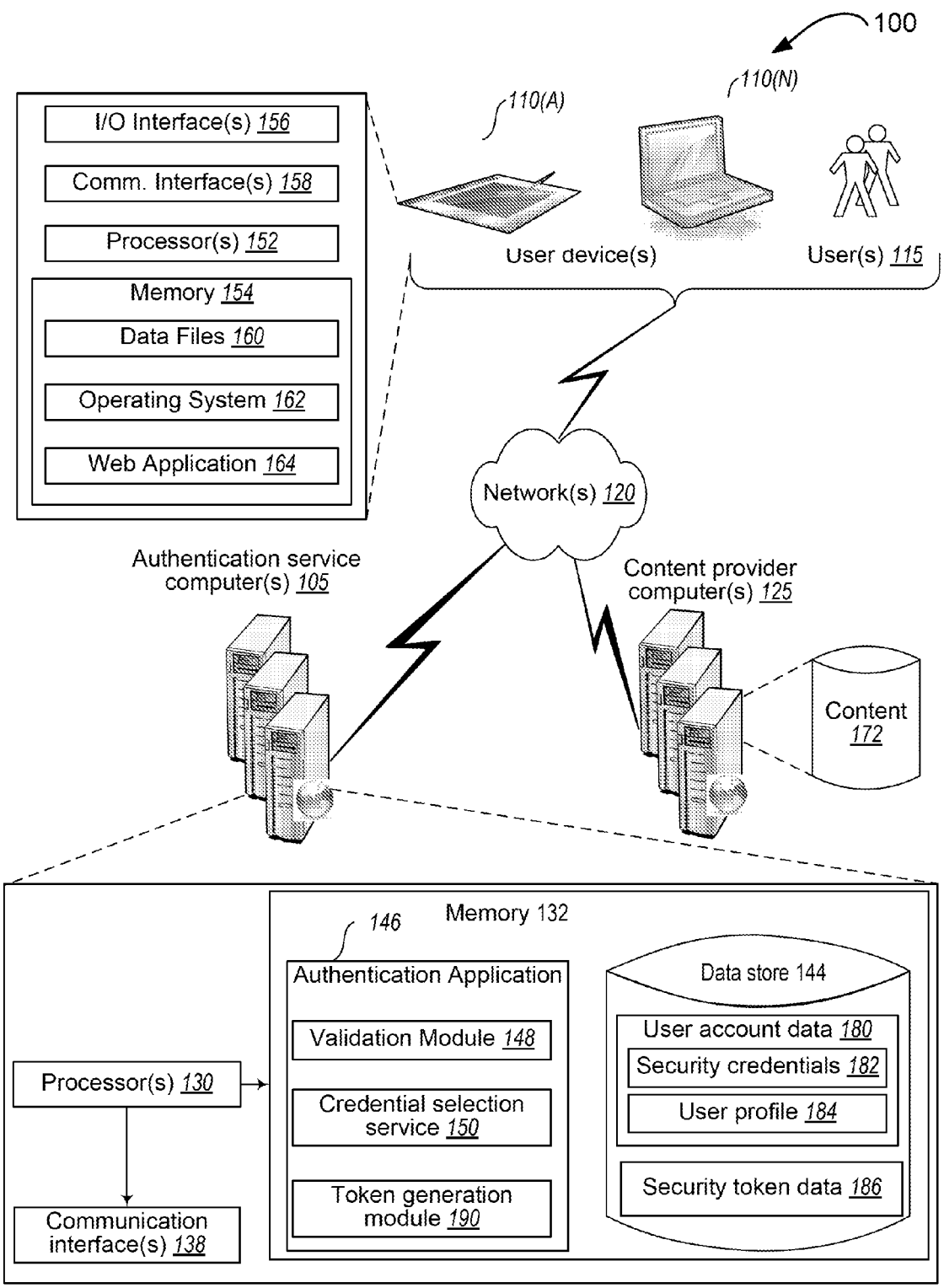
FIG. 1 illustrates an environment in which various embodiments may be implemented.

Techniques are presented for authenticating a user to a network resource based on receiving a portion of the user's authorization credential. In a network-based environment (e.g., based upon the Internet), a user may be required to authenticate himself or herself in order to receive permission to access the resource. In one instance, the user, via a client device, is prompted to verbally provide a portion of the user's authorization credentials. A service may randomly select the portion of the authorization credential to be provided by the user. When a user input is received from the client device, the input is compared to the portion of the user credential previously selected by the authorization service. If the user input matches with the portion of the credential, the user is authenticated and provided access to the website (or portion of the website).

For example, suppose a user would like to add a new credit card to their electronic wallet, which is maintained by an electronic commerce website (e.g., www.ecommerce.com). And further suppose that the website will not allow a user to add a new credit card to their wallet without first authenticating themselves. Instead of requesting the user to provide their username and password (e.g., enter the information into a website form, which is the conventional method of authentication), an authentication service associated with the website may ask the user, via their client device, to verbally provide a portion of their password, username or some other credential available to the service. As one illustrative example, the user's password may consist of a sequence of six numeric digits. The service may provide instructions to the client device to request that the user authenticate themselves by verbally providing the fifth digit, then the second digit, and then the sixth digit of their password. Upon receiving data from the client device representing the three digits provided by the user, the service determines whether to authorize the user to access their electronic wallet based on whether the digits provided by the user match the digits randomly selected by the service.

The request from the service, which is displayed via the client device, may not provide any portion of the user's authentication credentials. Alternatively, the request from the service may be verbally provided to the user by a client device capable of, for example, playing an audio file. The client device may transform the audio received from the user into text prior to sending the information to the authentication service or the service may receive, for example, an audio file from the client device, which is then transformed on the service-side to text.

The user, when requested to verbally communicate the selected portion of his or her credential, may recall the credential and speak the requested portion individually, in the order chosen by the authentication service. The spoken words may be voice-to-text encoded, and the text representation of the spoken portion of the credential may be analyzed by the authentication service for authentication. The authentication service may compare the spoken portion of the credential with the requested portion of the credential, and if a match is verified, the user may be authenticated.

A user may be required to provide a portion of a security token or passcode (e.g., a sequence of digits) supplied by a device (other than the client device) that generates hardware security tokens in addition to, or in place of, the user's authentication credentials for the network resource (e.g., username, password, etc.). The device generates time-synchronized one-time tokens that may periodically rotate, e.g., once per minute. In a two-factor authentication scheme, the service, via the client device, may request that the user provide a selected portion of the hardware security token displayed on the security token device after the user successfully authenticates themselves by providing their username and password, a portion of either, and the like. The user may be requested to verbally provide the hardware security token (or portion of it) in an order selected by the service.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 includes one or more electronic client (user) devices 110(A)-110(N), which can include any appropriate device operable to send and receive requests, messages, or information over an appropriate network 120 and convey information back to a user 115 of the device. Examples of such client devices include personal computers, cell phones, handheld messaging devices, laptop computers, set-top boxes, personal data assistants, electronic book readers, tablets, and the like. The client devices 110(A)-110(N) may include a processor 152 and memory 154 for storing processor-executable instructions, such as data files 160, operating system 162, and one or more web applications 164. The devices may further include at least one or more of the following elements: input/output interface 156 and communication interface 158. The client devices 110(A)-110(N) may also be equipped with a user interface (e.g., a display or a screen) 156. Alternatively or additionally, the client devices may also be equipped with a voice capability that may verbally communicate the authentication request to the user.

The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, and the environment includes one or more Web servers (content provider servers) 125 for receiving requests and serving content in response thereto, although for other networks, an alternative device serving a similar purpose could be used, as would be apparent to one of ordinary skill in the art.

The illustrative environment 100 includes at least one application server (e.g., authentication service server) 105 including, or associated with, one or more processors 130 that may be connected to a communication interface 138 and memory 132. The memory 132 may include, but is not limited to, authentication application module 146 that may include a validation module 148 storing processor-executable instructions for verifying user credentials, and credential selection service 150 storing processor-executable instructions for selecting or generating a security credential for a user. The processor-executable instructions for selecting or generating a security credential stored in credential selection service 150, when executed, cause the processor to generate a portion of the security credential associated with the user profile and stored with a data store 144. A user credential may take different forms. For example, a credential may include a password (e.g., a secret word or string of characters), a passphrase (a string of words), a passcode (e.g., purely numeric secret information, such as a PIN), or a combination of any of the above.

The processor-executable instructions stored in the validation module 148, when executed, verify the user's security credentials by matching the portion of the security credential generated by the instructions stored in credential selection service 150 with a corresponding portion provided by the user (in an embodiment, verbally) in response to an authentication request. The authentication application module 146 may further include a token generation module 190 that stores instructions for generating one-time security token sequences that may be used in an authentication process. The security tokens generated by the token generation module 190 are synchronized with the ones generated by the security token device associated with the user.

The memory 132 may further include a data store 144. The data store 144 that may store at least user account data 180 including, but not limited to, security credentials 182 associated with the user (e.g., user's password or passcode), and user profile 184. In an embodiment, the user profile 184 may include the user's address or other location information, and other attributes specific to the user. The user profile may contain information about client devices associated with the user (e.g., device ID). In an embodiment, the data store 144 may include security token data 186 that may include data necessary for generation of security tokens for a security token device associated with a user.

It should be understood that there can be several application servers, layers, or other elements, processes, or components, which may be chained or otherwise configured, which can interact to perform tasks such as obtaining data from an appropriate data store. As used herein, the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to a viewer, which may be served to the viewer by the Web server in the form of HTML, XML, or another appropriate structured language in this example. The handling of all requests and responses, as well as the delivery of content between the client devices 110(A)-110(N) and the application server 105, can be handled by the content provider Web server(s) 125. Each server may include an operating system that provides executable program instructions for the general administration and operation of that server, and may include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The Web and application servers are not required and are merely example components, as structured code discussed herein can be executed on any appropriate device or host machine as described elsewhere herein. The data store 144 can include several separate data tables, databases, or other data storage mechanisms and media for storing data relating to a particular aspect. For example, the data store illustrated includes mechanisms for storing production data and user information. The data store may include a mechanism for storing communication log data, which can be used for reporting, generating recipient groups, updating recipient groups, and other such purposes. It should be understood that there can be many other aspects that may need to be stored in the data store, such as page image information and access right information, which can be stored in any of the above-listed mechanisms as appropriate or in additional mechanisms in the data store 144.

The content data store 172 is associated with the server 125. The content data store 172 is operable, through logic associated therewith, to receive instructions from the server 125 and obtain, update, provide, or otherwise process data in response thereto. In one example, a user 115 might submit a search request for a certain type of item. In this case, the server 125 might access the user information 180 to verify the identity of the viewer, and can access the catalog detail information (e.g., content data store 172) to obtain information about requested items. The information then can be returned to the user 115, such as content on a Web page that the user is able to view via a browser on the client device 110(A)-110(N). The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limited to the scope of the disclosure.

In one embodiment, an authentication service may be provided via associated authentication service server 105. The authentication service may be configured to perform one or more service-related functions, such as, for example, provide an authentication request to the user in response to a request to access a network resource. The request may include a requirement that the user verbally communicate the portion of the user's credentials selected (e.g., randomly) by the service. A portion of the user's security credentials may in some embodiments be selected in other non-random manners, e.g., using customized or generic selection algorithms. The authentication service may be further configured to receive the user's verbal communication of a portion of a credential selected for authentication, transform (e.g., encode) the received communication in a data form readable by a computer, compare the encoded portion of the credential with that stored with the service, and grant access to the network resource if authentication is successful. Authenticated users may receive access to content and/or services not available to the public at large, such as, for example, product search services implemented, for example, by one or more content provider servers 125.

In another embodiment, the authentication service may make a request for a randomly selected portion of a security credential (e.g., a password) displayed on a user's security token for a determined period of time. The user may be requested to speak the portion of the security credential in the selected order to a speech recognition component of the client device, which may transform (e.g., encode) the spoken portion of the credential into computer-readable information. The authentication service may calculate the correct password which would be displayed on the token at that time, and compare the calculated code to the received encoded data. If a match is confirmed, the authentication process may be completed. In an embodiment, a combination of the embodiments described above may be implemented.

It is to be understood that the authentication service may comprise a number of various implementations, including, but not limited to, a software application component executed on a computing device, such as one or more Web servers. In one embodiment, the service may be offered as a part of remote computing services that together make up a cloud computing platform, offered over the Internet. The service may be configured to run in a Web server environment, such as a pure Java HTTP Web server environment. The embodiments of user authentication using speech recognition techniques will be described in greater detail in reference to FIGS. 2-6.

Figure 2:
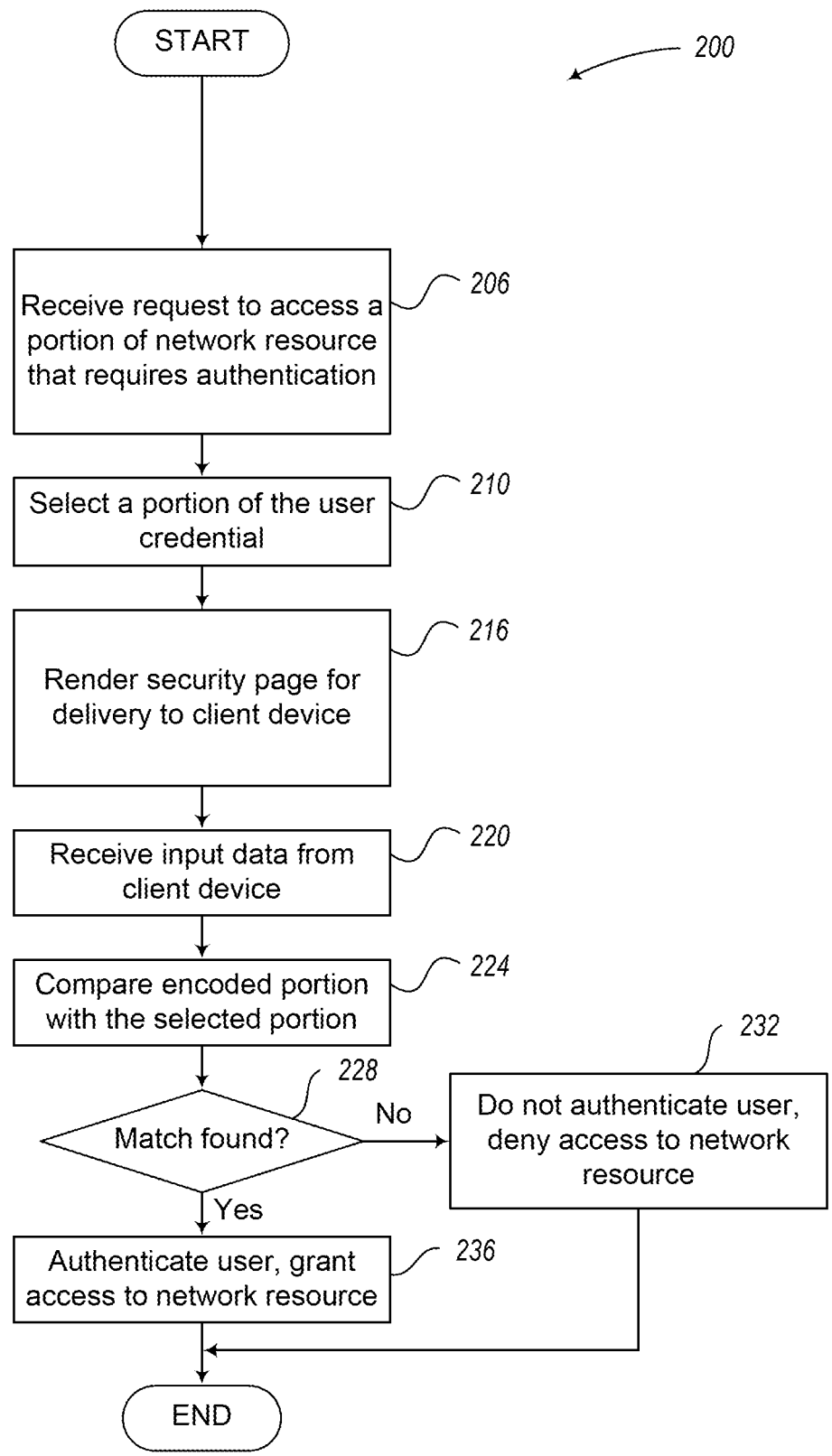
FIG. 2 illustrates a process flow diagram for user authentication with a network resource using speech recognition techniques in accordance with an embodiment.

FIG. 2 is a process flow diagram for user authentication with a network resource using speech recognition techniques in accordance with an embodiment. The authentication service described herein is configured to facilitate the process illustrated in FIG. 2. As discussed above, a user may register with a particular network resource in order to have access to one or more content items and/or services provided by the network resource that may not be provided to non-registered users. Registering with the resource may include providing user information (e.g., user name, password, billing address, shipping address, credit card information, etc.) to be stored with the network resource. In order to access a portion of the resource, a registered user may need to be authenticated by the network resource. For example, a user, upon access of the website, may be recognized by the website via a "cookie" stored on the client device. This may allow the website to personalize content to the user and provide access to the user to certain pages within the website. However, the user still may not be authorized to add a new credit card to the website "wallet", change their shipping address, change their password, and the like until the user is authenticated again (either once or for each specific action).

The process 200 begins at block 206, where a user request to access particular parts of a network resource with which the user is registered but may not be able to access without authentication is received. A network portion access request is but one reason for user authentication—different reasons for user authentication may apply. For example, a user may be initially authenticated by a network resource using a cookie stored on the client device (a "first level" of authentication). The user is then authorized to browse portions of the network resource based on the security features in the cookie. However, in order to conduct particular operations on the resource (e.g., make a purchase using credit card information stored with the network resource, access personal information, and the like), the user may be required to authenticate herself again (a "second level" of authentication), this time using a portion of her password as described below in greater detail. Accordingly, the user request to access a portion of a network resource that requires authentication may trigger the authentication process.

At block 210, a security credential associated with the identified user may be retrieved by the authentication service from the stored user information. As discussed above, the security credential may include a passcode, passphrase, username, password, or the like stored with user information. In another example, a user may submit her security credential with the request to access a portion of a network resource at a "first level" of authentication, when the user is registered with the network resource. A portion of the user security credential may then be selected (in an embodiment, randomly) by the authentication service. A random selection of the portion of the user security credential may take different forms, depending at least in part on a form of the credential. Different mechanisms may be employed for a random selection, such as, for example, random number generators known in the art.

Suppose, for example, that the user's security is a six-digit Personal Identification Number (PIN) 174935. In order to authenticate a user in order, for example, to authorize the user to access certain portions of the network resource, the authentication service may select three PIN positions (e.g., the first digit, the fourth digit, and the fifth digit) from the stored six-digit PIN. A security credential is not limited to PINs that include only numbers. For example, a security credential may comprise a passphrase of multiple tokens, e.g., "apple, orange, peach, pear." In this instance, the service may select particular tokens in the passphrase, for example, the second and fourth tokens in the passphrase ("orange, pear"), and require the user to verbally provide the selected tokens back to the service to be authenticated. As another example, a selection of the portion of the user security credential may include selecting a mathematical operation to be executed by the user on a subset of the digits in the randomly selected positions of the security credential. For example, particular PIN positions of a known PIN may be selected to be added together.

At block 216, a security page may be rendered to the client device from which the request to access a portion of the network was received. The security page may include a request for the user to verbally provide a selected portion of the security credential back to the authentication service (using the above example, the first digit, the fourth digit, and the fifth digit in either that order or another order). The request may read, for example: "Please verbally enter the digits occupying first, fourth, and fifth positions in your PIN" or "Please say the second and fourth words of your passphrase." In another example, the page may include a request to execute a mathematical operation on the selected portion of the security credential and verbally provide the result. In another example, the request may be communicated by executing an audio file on the client device so that the user may listen to the request. In yet another example, the authentication service may provide a file containing the request to the client device that may be rendered by the browser (if provided via the Internet). The request may also take a form of an SMS message, email, and the like.

At block 220, input data resulting from the communication of the selected portion of the credential to the client device is received. For example, the user may verbally communicate the requested portion of the security credential as requested in 216. The verbal communication may be transformed (encoded) into computer-readable data on the client device. The transformation into the computer-readable data may be accomplished using known speech recognition techniques, such as a voice-user interface (VUI). In another example, an audio file containing the verbal communication data may be received from the client device. In another example, the user may type in her response to the authentication request provided at 216 to the client device and the resulting data may be received by the server from the client device. Generally, encoding of audio into text may occur on either on the client device, within the authentication service computer(s), or with any external service, including utilizing a third party speech-to-text encoding service. At block 224, the encoded data is compared with the selected portion of the credential stored with the authentication service. Alternatively, the selected portion may be generated by the authentication service (e.g., using a crypto key or other technique) and provided for comparison with the encoded data.

At decision block 228, it is determined whether the data received from the client device matches the selected portion of the credential stored with (or generated by) the authentication service. Matching may include using a statistical technique to evaluate whether the two compared portions of data are matched within a desired threshold probability level. If the data does not match, the user is not authenticated and access to the portion of network resource associated with the request (block 206) is denied, at block 232. If the data does match, the user is authenticated and access to the network resource is granted, at block 236.

Figure 3:
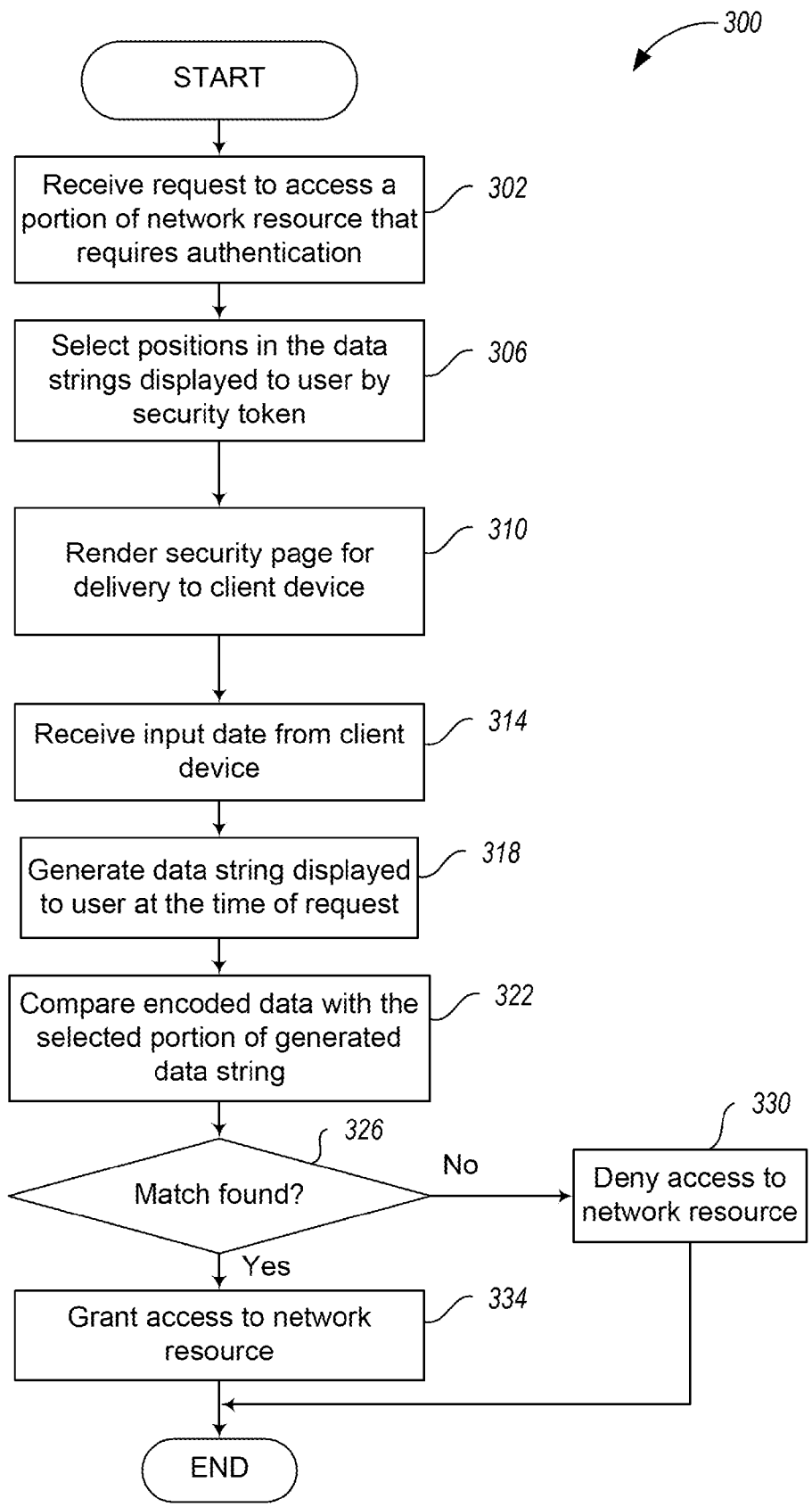
FIG. 3 illustrates a process flow diagram for user authentication with a network resource using speech recognition techniques in accordance with another embodiment.

FIG. 3 is a process flow diagram for user authentication with a network resource using speech recognition techniques in accordance with another embodiment. As briefly described above, a user may be supplied with a device generating hardware security token associated with a particular network resource. The security token device may periodically generate one-time passcodes (e.g., sequences of digits) that change at a set time interval, e.g., once per minute. The passcodes may be time-synchronized with the authentication service so that the service may generate or otherwise identify any passcode generated by the token at any given time. The security token may be used for user authentication using verbal communication by the user as illustrated by the process 300.

The process 300 begins with block 302, where a user request to access particular parts of a network resource with which the user is registered but may not be able to access without authentication is received as described in reference to FIG. 2. At block 306, a portion of a security token, for example, a number of positions in the sequence of digits of a security token may be selected for user authentication. A number and order of positions may be chosen at random.

At block 310, a security page may be rendered to the client device from which the request to access a portion of the network was received. The security page may include a request for the user to verbally provide a selected portion of the security token displayed to the user on the security token device. For example, the user may be requested to say the digits placed in the selected positions in the sequence being displayed to the user on the security token device at the time of the request. The request may be provided in a number of different ways described in reference to FIG. 2. For example, the request, if received in a form of a text file and displayed to the user, may read: "Please say the digits occupying first, fourth, and fifth positions in the sequence currently displayed on your security token device."

At block 314, input data resulting from the communication of the selected portion of the credential to the client device is received. As discussed in reference to FIG. 2, the user may verbalize the requested positions of the requested sequence and the resulting audio may be captured by the client device. The spoken portion of the sequence may be then transformed into computer-readable form (e.g., text file). In an embodiment, the transforming may occur on the client device if the device is so configured.

At block 318, the sequence of digits displayed to the user at the time of the request may be generated or otherwise identified by the authentication service, using, for example, a cryptographic technique. For example, a cryptographic hash function may be used to take the selected portion of the sequence as input and produce a fixed-length hash value. At block 322, the received encoded portion of the sequence may be compared with the selected portion of the generated sequence. Using the above example, the hash value generated by the service may be compared with the corresponding hash value produced from the received encoded portion of the sequence. At decision block 326, it is determined whether a match between the two portions of the string is found. If the match is not found, at block 330, the access to the network resource is denied. If the match is found, at block 334 the access to the network resource is granted.

Figure 4:
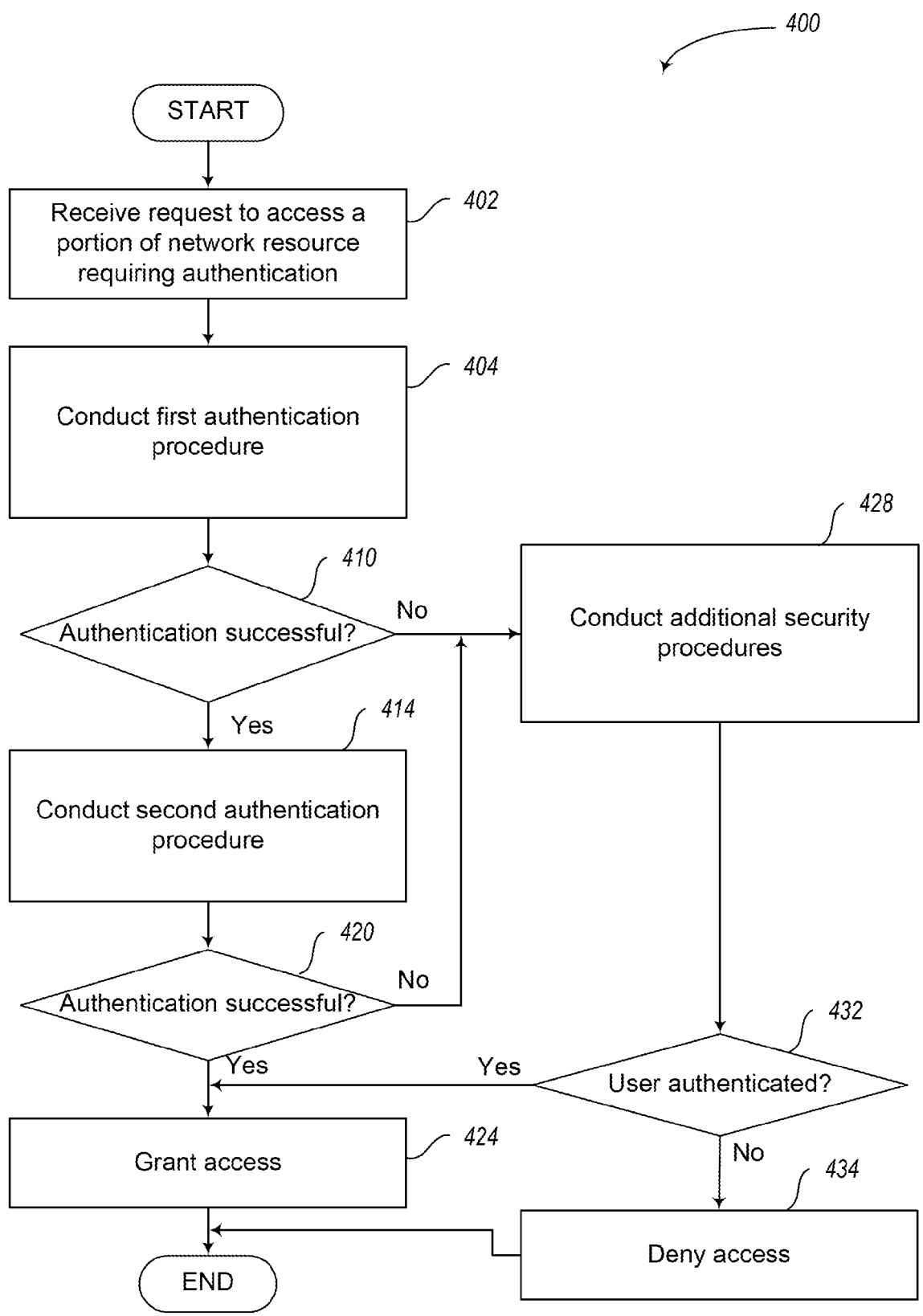
FIG. 4 illustrates a process flow diagram for user authentication with a network resource using speech recognition techniques in accordance with yet another embodiment.

FIG. 4 is a process flow diagram for user authentication with a network resource using speech recognition techniques in accordance with yet another embodiment. The embodiments described in reference to FIGS. 2 and 3 may be used in combination, known as "two-factor authentication." Accordingly, the authentication service may be configured to perform two-factor authentication, including, for example, a first authentication procedure as described in reference to FIG. 3 and a second authentication procedure as described in reference to FIG. 2. The process 400 begins at block 402, where a user request to access particular parts of a network resource with which the user is registered but may not be able to access without authentication is received from a client device as described in reference to FIG. 2. At block 404, a first authentication procedure similar to one described in reference to FIG. 3 is conducted. For example, a portion of the sequence of digits in the security token is selected, a security page requesting the user to verbally submit the selected portion of the security token is sent to the client device, and the user input data provided in response to the request is received and verified (e.g., the submitted data is matched with the data associated with the selected portion of the security token). At decision block 410, it is determined whether the first authentication procedure is successful. If the first authentication procedure is successful, at block 414 a second authentication procedure is conducted similarly to that described in reference to FIG. 2. For example, a portion of the user security credential stored with the user information is selected, a security page requesting that a user verbally communicate the selected portions of the credential is sent to the client device, and the user input data provided in response to the request is received and verified (e.g., the submitted data is matched with the data associated with the selected portion of the security credential).

At decision block 420 it is determined whether the second authentication procedure is successful. If the second authentication procedure is successful, at block 424 the user is authenticated and authorized to access the requested portion of the network resource. If the verbally provided portion of the credential is not verified, at block 428 additional security procedures may be conducted in order to authenticate a user even though they did not initially provide the correct information at block 404. For example, a user may be requested to verbally provide an answer to one or more secret questions stored with the authentication service. Other security measures may be used to authenticate a user such as, by way of example only, require the user to call the network resource for verification, etc. At decision block 432, it is determined whether to authenticate the user based on the additional security procedures. If the user-provided information is found satisfactory, the user is authenticated and authorized to access the requested portion of the network resource, at block 424. If the user is not authenticated, access to the requested portion of the network resource is denied at block 434.

Figure 5:
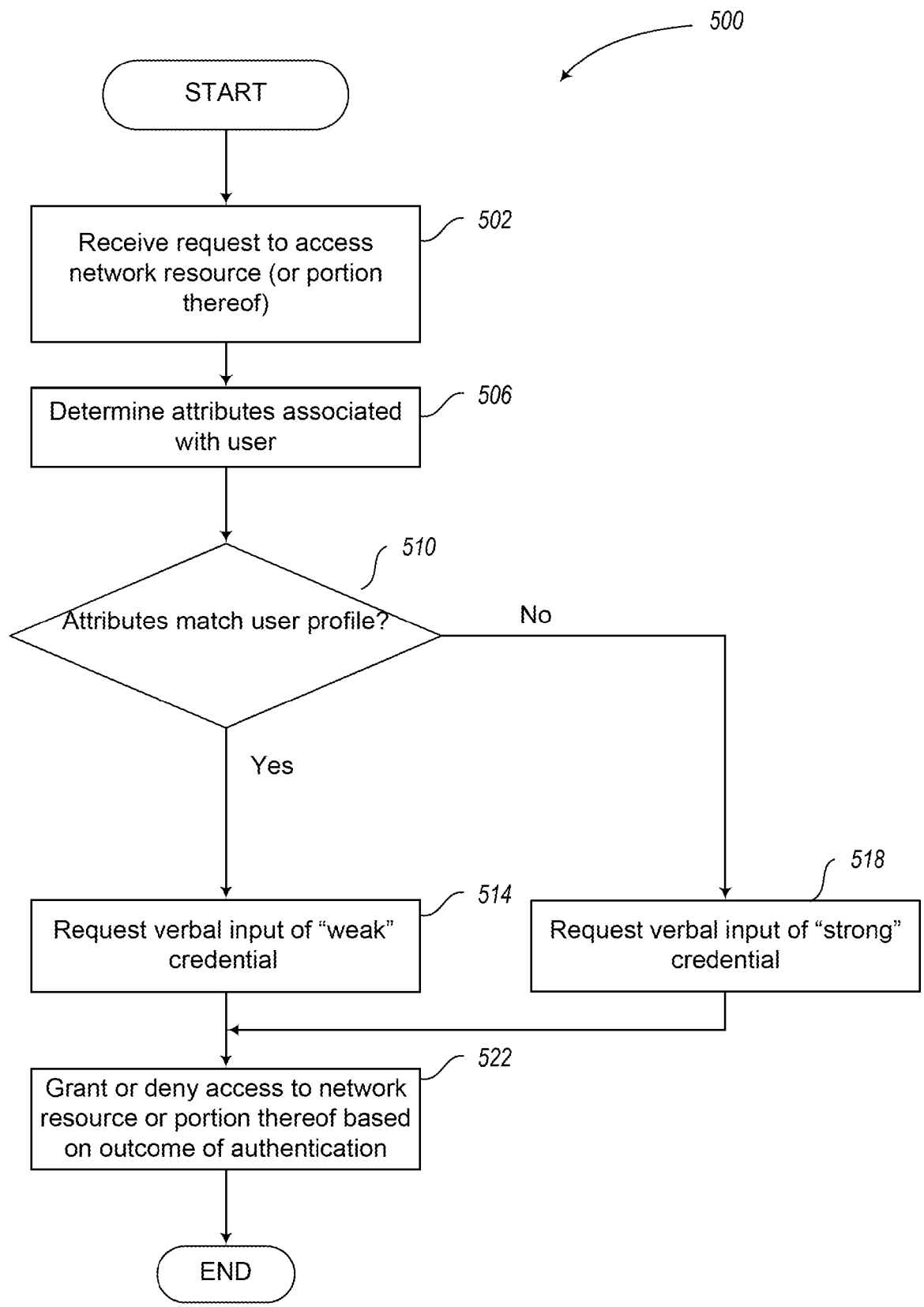
FIG. 5 illustrates a process flow diagram for user authentication with a network resource using speech recognition techniques in accordance with yet another embodiment.

FIG. 5 is a process flow diagram for user authentication with a network resource using speech recognition techniques in accordance with yet another embodiment. In an embodiment, the authentication service may be configured to dynamically determine whether to request a user to provide a "strong" or weak" security credential (e.g., 4 digits of a PIN versus 2 digits of the same PIN) depending on an ability to identify one or more attributes (e.g., user computing device identification number) associated with the user requesting access to a network resource. The process 500 begins at block 502, where a request to access a network resource or portion of it (that requires authentication) is received from a client device. The request may include, among other things, a device ID, a user ID, client device location information, such as GPS coordinates of the device or an IP address, and the like. As described above, a user may be registered with the network resource via a cookie, for example, or otherwise identified by the network resource.

At block 506, attributes associated with the identified user may be determined. For example, it may be determined whether the user is accessing the network resource from an internal network (e.g., shares the same network as the resource) or an external network, whether the user device ID is recognized as a device that has previously accessed the network resource, whether the client device is located within a geographical area associated with the user, and the like. A time of day may also be considered, for example, whether a client device associated with the user ever accessed the network resource during a particular time period, e.g., between 12 a.m. and 3 a.m. At decision block 510, it is determined whether any of the data associated with the request does not correlate with information contained in the user profile. For example, the submitted client device identification information may be compared with one stored with the user profile. For example, if it is determined that at least a portion of the information included in the request (e.g., one of the attributes) does not correlate with the user profile, the authentication service may request that the user verbally provide a "strong" credential at block 518. Using the example of a six-digit PIN shown above, the authentication service may, for example, request the user to verbally communicate four digits of the PIN (e.g., the first digit, the third digit, the fourth digit, and the fifth digit)—as opposed to the default request for three digits. If all submitted identification information matches the stored user information, a "weak" security credential may be requested at block 514.

In another example, for particular tasks (e.g., access to credit card information on an e-commerce network resource), a determined number or determined types of attributes may be required to correlate with the user profile. Accordingly, if the required attributes match the user information, at block 514 the user may be requested to provide a verbal input of a "weak" credential. For example, the user may be requested to verbally communicate two digits (e.g., first and fourth) of the user's six-digit PIN—as opposed to the default request for three digits. At block 522, additional security procedures may be employed (e.g., as discussed in reference to FIG. 4) and the access to the network resource may be granted or denied depending on the outcome of the authentication process.

FIGS. 6A, 6B, and 6C illustrate example user interfaces 600 provided by the authentication service for a mobile client device. The user interfaces illustrated in FIGS. 6A, 6B, and 6C are shown for illustrative purposes only and should not be interpreted as limiting the scope of the various embodiments. The example user interfaces illustrate one embodiment of a user experience through the process described in FIG. 4 (requiring a two-factor authentication).

FIG. 6A illustrates a Web page 602 received from the authentication service and displayed by a client device (assuming the mobile device is configured with a Web browser). Page 602 displays a message asking the user to verbally communicate the first and fourth digits of a security token being provided by a device other than the mobile device in accordance with the first authentication procedure described in reference to FIG. 4. It is assumed that the client device is configured with a speech recognition capability that allows to receive verbal communication from the user and transform the communication in a computer-readable, e.g., textual, form. In accordance with the first authentication procedure, the authentication service receives and analyzes the user input data corresponding to the portion of the security token provided by the user in response to a request shown on page 602.

If the first authentication procedure is successful as determined at block 410 in FIG. 4, the authentication service provides a page 604 shown in FIG. 6B in accordance with the second authentication procedure described in reference to FIG. 4. Page 604 displays a confirmation that Step 1 of the authentication process (i.e., first authentication procedure) was successful (e.g., when a match is determined between the received user input data and the selected portion of the security token). Page 604 also displays a message asking the user to verbally communicate the second and fourth words of the user's passphrase stored with the authentication service in accordance with the second authentication procedure described in reference to FIG. 4. Page 606 of FIG. 6C shows a confirmation that Step 2 of the authentication process (i.e., second authentication procedure) was successful (e.g., when user input data corresponding to the second and fourth words of the user's passphrase matches the second and fourth words stored with the service). Screen 606 also shows a confirmation that access to a network resource is granted to the authenticated user.

As discussed above, the various embodiments can be implemented in a wide variety of operating environments which, in some cases, can include one or more client computers, computing devices, or processing devices which can be used to operate any of a number of applications. Client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response to requests from client devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation, those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices, such as random access memory ("RAM") or read-only memory ("ROM"), as well as removable media devices, memory cards, flash cards, and the like.

Such devices also can include a computer-readable storage media reader, a communications device (e.g., a modem, a network card (wireless or wired), an infrared communication device), and working memory as described above. The computer-readable storage media reader can be connected with, or configured to receive, a computer-readable storage medium, representing remote, local, fixed, and/or removable storage devices, as well as storage media for temporarily and/or more permanently containing, storing, transmitting, and retrieving computer-readable information. The system and various devices will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer-readable media for containing code, or portions of code, can include any appropriate media known or used in the art, including storage media and communication media, such as, but not limited to, volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the present disclosure as set forth in the claims.

What is claimed is:
1. A computer-implemented method comprising:
receiving, by a configured computing system, an authentication request to access a network resource on behalf of an indicated user;
determining, by the configured computing system, whether an attribute associated with the authentication request matches stored information previously associated with the indicated user;
generating, by the configured computing system and based at least in part on the determining, an authorization code that is based on a defined security credential for the indicated user, wherein the generating includes determining to use a higher level of strength for the generated authorization code if the attribute does not match the stored information and otherwise to use a lower level of strength for the generated authorization code by select- ing a subset of the security credential that is less than all of the security credential to use as the generated authorization code;

providing, by the configured computing system, instructions to the indicated user regarding supplying the generated authorization code to obtain access to the network resource;

receiving, by the configured computing system, the generated authorization code from the indicated user in response to the provided instructions; and authorizing the access to the network resource based at least in part on the received generated authorization code.

2. The computer-implemented method of claim 1 wherein the attribute is a network being used by a client device of the indicated user, and wherein the determining is whether the network is an internal network associated with the configured computing system.

3. The computer-implemented method of claim 1 wherein the attribute is a geographical location of the indicated user, and wherein the determining is whether the geographical location is within a defined geographical area previously associated with the indicated user.

4. The computer-implemented method of claim 1 wherein the attribute is information about a client device being used by the indicated user, wherein the stored information previously associated with the indicated user is a user profile from previous registration activities of the indicated user, and wherein the determining is whether the information about the client device matches device information included in the user profile.

5. The computer-implemented method of claim 1 wherein the stored information previously associated with the indicated user includes information about one or more client devices previously used by the indicated user to access the network resource, wherein the attribute is information about a current client device of the indicated user, and wherein the determining includes determining whether the current client device matches one of the previously used one or more client devices.

6. The computer-implemented method of claim 1 wherein the stored information previously associated with the indicated user includes information about one or more time of day periods during which the indicated user previously accessed the network resource, wherein the attribute is a current time of day, and wherein the determining includes determining whether the current time of day matches one of the one or more time of day periods.

7. The computer-implemented method of claim 1 wherein the stored information previously associated with the indicated user includes a user profile that has information previously supplied by the indicated user.

8. The computer-implemented method of claim 1 wherein the determining includes determining that the attribute does match the stored information, and wherein the generating of the authorization code includes selecting the generated authorization code to be the subset of the security credential.

9. The computer-implemented method of claim 8 wherein the security credential includes a plurality of characters, and wherein the selected generated authorized code includes one or more characters of the plurality and excludes at least one character of the plurality.

10. The computer-implemented method of claim 8 wherein the security credential includes a plurality of numerical digits, and wherein the selected generated authorized code includes one or more numerical digits of the plurality and excludes at least one numerical digit of the plurality.

11. The computer-implemented method of claim 8 wherein the security credential includes a plurality of words, wherein the selected generated authorized code is selected to be at a weak strength that includes one or more words of the plurality and excludes at least one word of the plurality, and wherein the authorizing of the access includes providing the indicated user with the access to the network resource.

12. The computer-implemented method of claim 8 wherein the providing of the instructions includes providing information to enable the indicated user to identify a portion of the security credential that is selected to be the subset.

13. The computer-implemented method of claim 8 wherein the receiving of the generated authorization code from the indicated user includes receiving the subset of the security credential but not receiving all of the security credential.

14. The computer-implemented method of claim 1 wherein the determining includes determining that the attribute does not match the stored information, and wherein the generating of the authorization code includes the using the higher level of strength by selecting the generated authorization code to include some or all of the security credential.

15. The computer-implemented method of claim 14 wherein the selecting of the generated authorization code to include some or all of the security credential includes selecting the generated authorization code to be at a strong strength level that includes all of the security credential.

16. The computer-implemented method of claim 14 wherein the security credential is defined for the user before the receiving of the authentication request, wherein the selecting of the generated authorization code to include some or all of the security credential includes selecting, to be the generated authorization code, a second subset of the security credential that is a different length than the subset of the security credential for the lower level of strength.

17. The computer-implemented method of claim 1 further comprising determining, by the configured computing system, whether the authentication request is part of a specified type of task, and wherein the generating of the authorization code further includes determining whether to use the higher level of strength or the lower level of strength based in part on whether the authentication request is determined to be part of the specified type of task.

18. The computer-implemented method of claim 1 wherein the stored information is part of a stored user profile for the indicated user, wherein the method further comprising determining, by the configured computing system, a quantity of multiple attributes associated with the authentication request to match to the stored user profile, and wherein the generating of the authorization code further includes determining whether to use the higher level of strength or the lower level of strength based in part on whether the determined quantity of multiple attributes associated with the authentication request are determined to match the stored user profile.

19. A computer system comprising:
at least one processor; and
at least one memory having computer-executable instructions that, when executed on the at least one processor, cause the at least one processor to:
receive, from a client device of a user, an authentication request to access a network resource on behalf of the user;
determine that an attribute associated with the authentication request matches information associated with the user;
generate, based at least in part on the determining, an authorization code for the user using a security credential, wherein the generating includes selecting one of multiple levels of strength to use for the generated authorization code based on the attribute being determined to match the information and further includes selecting, based on the selected one level of strength, a subset of the security credential that is less than all of the security credential to use for the generated authorization code;

provide, to the client device, instructions regarding the user supplying the generated authorization code;

receive, from the client device, the generated authorization code; and authorize the access to the network resource based at least in part on the received generated authorization code.

20. The computer system of claim 19 wherein the selected one level of strength is weaker than a second strength level of the multiple levels of strength that applies if the attribute associated with the authentication request does not match the information associated with the user, and wherein the computer-executable instructions further cause the at least one processor to:

receive, from a second client device of a second user, a second authentication request to access the network resource on behalf of the second user;

determine that a second attribute associated with the second authentication request does not match information previously associated with the second user;

generate, based at least in part on the determining, a second authorization code using a second security credential that is defined for the second user before the receiving of the second authentication request, wherein the generating includes selecting the second strength level to use for the generated second authorization code based on the second attribute being determined to not match the information previously associated with the second user and further includes selecting, based on the selected second strength level, to use all of the second security credential for the generated second authorization code;

provide, to the second client device, instructions regarding the second user supplying the generated second authorization code;

receive, from the second client device, the generated second authorization code; and authorize and provide the access to the network resource for the second user based at least in part on the received generated second authorization code.

21. A non-transitory computer-readable medium having computer-executable instructions stored thereon that, when executed by a computer, configure the computer to:

determine, by the configured computer and for a request for a user to access a network resource, that an attribute associated with the request matches information associated with the user;

generate, by the configured computer and based at least in part on the determining, an authorization code for the user using a security credential, wherein the generating includes selecting one of multiple levels of strength to use for the generated authorization code based on the attribute being determined to match the information and further includes selecting, based on the selected one level of strength, a subset of the security credential that is less than all of the security credential to use for the generated authorization code;

provide, by the configured computer, instructions to the user regarding supplying the generated authorization code;

receive, by the configured computer, the generated authorization code from the user; and authorize the access to the network resource based at least in part on the received generated authorization code.

22. The non-transitory computer-readable medium of claim 21 wherein the selected one level of strength is lower than a second strength level of the multiple levels of strength that applies if the attribute associated with the request does not match the information associated with the user, and wherein the computer-executable instructions further configure the computer to:

receive a second request for a second user to access a second network resource;

determine, by the configured computer, that a second attribute associated with the second request does not match information previously associated with the second user;

generate, by the configured computer and based at least in part on the determining, a second authorization code using a second security credential that is defined for the second user before the receiving of the second request, wherein the generating includes selecting the second strength level to use for the generated second authorization code based on the second attribute being determined to not match the information previously associated with the second user and further includes selecting, based on the selected second strength level, to use all of the second security credential for the generated second authorization code;

provide, by the configured computer to a client device of the second user, instructions to the second user regarding supplying the generated second authorization code;

receive, by the configured computer, the generated second authorization code from the client device of the second user; and authorize and provide, by the configured computer, the access to the second network resource for the second user based at least in part on the received generated second authorization code.

* * * * *